US012234783B1

(12) United States Patent
Nawata et al.

(10) Patent No.: US 12,234,783 B1
(45) Date of Patent: Feb. 25, 2025

(54) CONTROL UNIT FOR ENGINE SYSTEM

(71) Applicant: TOYOTA JIDOSHA KABUSHIKI KAISHA, Toyota (JP)

(72) Inventors: Hidekazu Nawata, Toyota (JP); Yoshikazu Asami, Toyota (JP); Yuki Morita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/788,059

(22) Filed: Jul. 29, 2024

(30) Foreign Application Priority Data

Sep. 27, 2023 (JP) ................................ 2023-166217

(51) Int. Cl.
*F02D 41/02* (2006.01)

(52) U.S. Cl.
CPC .. *F02D 41/0255* (2013.01); *F02D 2200/0804* (2013.01)

(58) Field of Classification Search
CPC ........... F01N 3/2006; F01N 2900/1602; F02D 41/024; F02D 41/0245; F02D 41/0255; F02D 2200/0802; F02D 2200/0804; Y02A 50/20; Y02T 10/12; Y02T 10/40
See application file for complete search history.

(56) References Cited

U.S. PATENT DOCUMENTS

| | | | | |
|---|---|---|---|---|
| 8,359,829 | B1 * | 1/2013 | Ramberg | B60W 20/40 60/285 |
| 9,440,654 | B2 * | 9/2016 | Atluri | B60W 10/08 |
| 2005/0091965 | A1 * | 5/2005 | Ries-Mueller | F02D 13/0261 60/285 |
| 2017/0234186 | A1 * | 8/2017 | Saitoh | F01N 3/2066 60/301 |
| 2019/0178181 | A1 * | 6/2019 | Lupescu | F01N 3/18 |
| 2020/0378781 | A1 * | 12/2020 | Kantarjiev | G01C 21/3691 |
| 2022/0003179 | A1 * | 1/2022 | Uhrich | F02D 41/042 |
| 2022/0289170 | A1 * | 9/2022 | Hoshi | B60W 10/06 |

FOREIGN PATENT DOCUMENTS

| | | |
|---|---|---|
| JP | 2019-7464 A | 1/2019 |

* cited by examiner

*Primary Examiner* — Dapinder Singh
(74) *Attorney, Agent, or Firm* — Oblon, McClelland, Maier & Neustadt, L.L.P.

(57) ABSTRACT

A control unit for an engine system including an engine and a catalyst for purifying exhaust gas from the engine, the control unit includes an engine control unit, a detection unit, a determination unit, and a stopping unit.

5 Claims, 7 Drawing Sheets

CONTROL UNIT FOR ENGINE SYSTEM

CROSS-REFERENCE TO RELATED APPLICATION

This application is based upon and claims the benefit of priority of the prior Japanese Patent Application No. 2023-166217, filed on Sep. 27, 2023, the entire contents of which are incorporated herein by reference.

TECHNICAL FIELD

The present disclosure relates to a control unit for an engine system.

BACKGROUND

When a temperature of the catalyst at the time of engine start is equal to or lower than a predetermined value, an electronic control unit (ECU) starts the engine and performs a warm-up process for raising the temperature of the catalyst to a warm-up temperature (see, for example, Japanese Unexamined Patent Application Publication No. 2019-007464).

In the above technique, the temperature of the catalyst at the time of engine start is estimated based on a stop period of the engine and an outside air temperature during the stop period. In this method, the estimated catalyst temperature at the time of engine start is a constant value under the condition that the stop period and the outside air temperature are the same. However, the temperature of the catalyst at the time of engine stop varies depending on the operating state of the engine up to that time. Therefore, the estimated temperature of the catalyst at the time of engine start may deviate greatly from an actual temperature. As a result, for example, the estimated temperature of the catalyst might be estimated to be lower than the actual temperature, and the warm-up process might be performed at the time of engine start, resulting in an excessive temperature rise of the catalyst.

In the above technique, the measurement of the stop period of the engine needs to be performed in a state where the ECU is stopped. In addition, in order to acquire the outside air temperature during the stop period of the engine, it is needed to always activate the ECU or periodically activate the ECU. Thus, the control might be complicated.

SUMMARY

It is therefore an object of the present disclosure to provide a control unit for an engine system that suppresses excessive temperature rise of a catalysts by simple control.

The above object is achieved by a control unit for an engine system including an engine and a catalyst for purifying exhaust gas from the engine, the control unit includes: an engine control unit configured to start the engine and perform a warm-up process for raising a temperature of the catalyst to a warm-up temperature when a temperature of the engine at an initial start of the engine after activation of the control unit is equal to or lower than a cold temperature, and configured to stop the engine when a stop request to the engine system is made; a detection unit configured to detect a temperature of the engine when the stop request is made; an estimation unit configured to estimate a temperature of the catalyst based on an operation state of the engine from a start of the engine to the stop request, when the stop request is made; a determination unit configured to perform a determination process for predicting whether or not the temperature of the catalyst rises excessively due to execution of the warm-up process at a time of the initial start of the engine after next activation of the control unit, based on the temperature of the engine and the temperature of the catalyst, when the stop request is made; and a stopping unit configured to stop the control unit based on a determination result of the determination unit, wherein when the determination result is a negative determination, the stopping unit stops the control unit, when the determination result is a positive determination, the determination unit reperforms the determination process, when the determination result is a positive determination and there is a request to start the engine system, the engine control unit starts the engine without performing the warm-up process, and when the determination result obtained by reperforming the determination process is a negative determination, the stopping unit stops the control unit.

The engine system may include a motor that performs motoring of the engine in a state where fuel injection is stopped and a throttle valve is opened, and the control unit may further include a motoring control unit configured to perform motoring of the engine by the motor when the determination result is a positive determination.

The engine system may include a radiator that cools cooling water of the engine and a fan that cools the radiator and the catalyst, and the control unit may further include a fan control unit configured to drive the fan when the determination result is a positive determination.

When the stop request is made, the determination unit may be configured to make a positive determination in a case where the temperature of the engine is equal to or lower than the cold temperature and the temperature of the catalyst is equal to or higher than a limit temperature lower than the warm-up temperature, when the stop request is made, the determination unit may be configured to make a negative determination in a case where the temperature of the engine is higher than the cold temperature or in a case where the temperature of the catalyst is lower than the limit temperature, and the limit temperature may be a temperature at which the temperature of the catalyst excessively rises due to execution of the warm-up process at the time of initial start of the engine after the next activation of the control unit.

When the stop request is made and the temperature of the engine is higher than the cold temperature, the determination unit may be configured to predict that the warm-up process is not performed at the time of initial start of the engine after the activation of the control unit, and to make the negative determination, and when the stop request is made and the temperature of the catalyst is lower than the limit temperature, the determination unit may be configured to predict that the temperature of the catalyst does not excessively rise even if the warm-up process is performed at the time of initial start of the engine after the activation of the control unit, and to make the negative determination.

DETAILED DESCRIPTION

[Schematic Configuration of Hybrid Vehicle]

Figure 1:
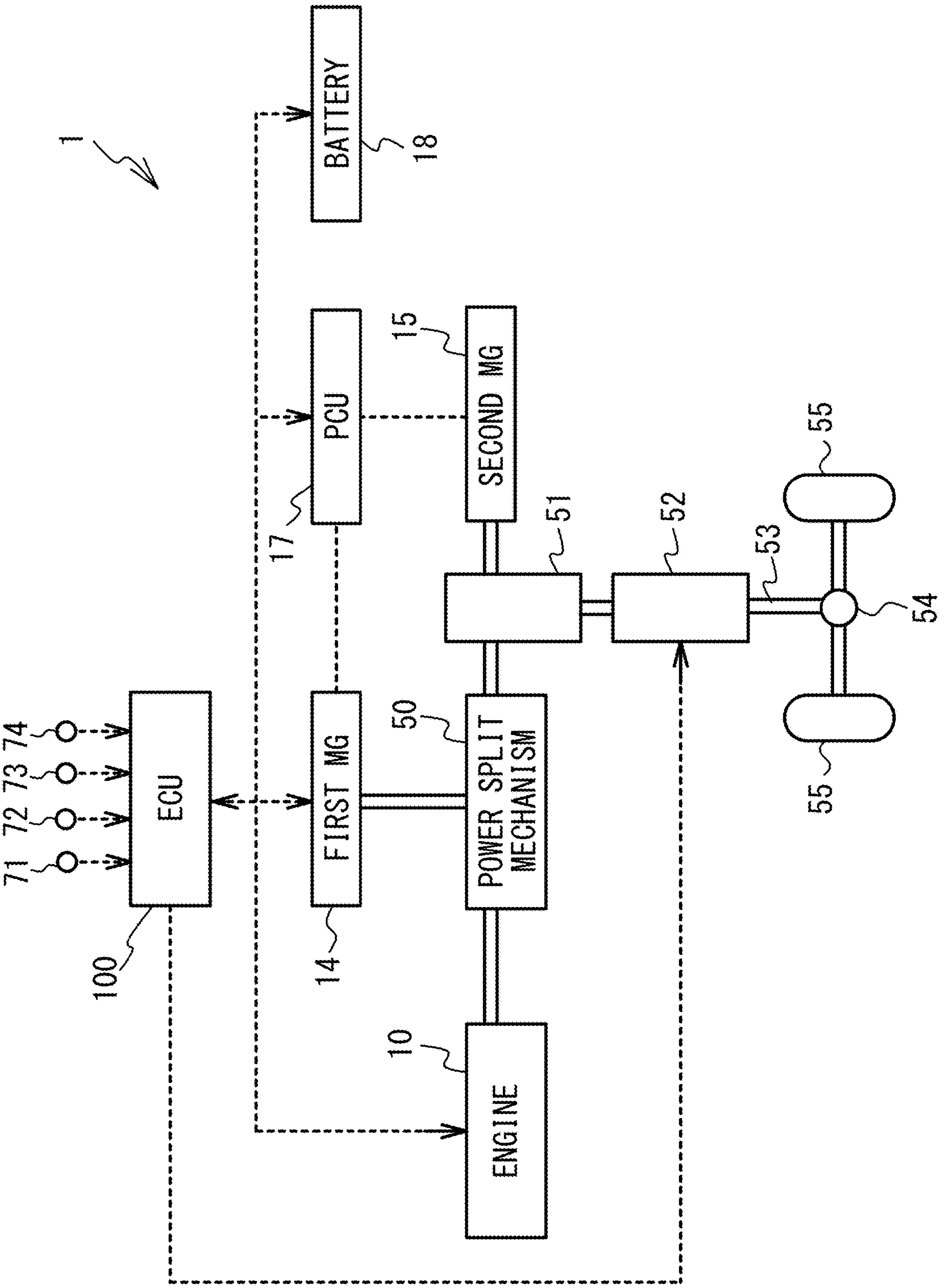
FIG. 1 is a schematic configuration view of an engine system.

FIG. 1 is a schematic configuration view of an engine system 1. In the present embodiment, the engine system 1 is mounted on a hybrid vehicle. The engine system 1 includes an electronic control unit (ECU) 100, an engine 10, a first motor generator (hereinafter referred to as first MG (motor generator) 14, a second motor generator (hereinafter referred to as second MG) 15, a power control unit (PCU) 17, a battery 18, a power split mechanism 50, a transmission mechanism 51, a gearbox 52, a drive shaft 53, differentials 54, and drive wheels 55. The engine 10 is a gasoline engine, but is not limited thereto, and may be a diesel engine. The engine 10, the first MG 14, and the second MG 15 are power sources for traveling of the hybrid vehicle.

Each of the first MG 14 and the second MG 15 has a function as a motor that outputs torque by electric power supply and a function as a power generator that generates regenerative electric power by torque being applied. The first MG 14 and the second MG 15 are electrically connected to the battery 18 via the PCU 17. The PCU 17 supplies electric power from the battery 18 to the first MG 14 or the second MG 15. The PCU 17 causes the battery 18 to receive the regenerative electric power generated in the first MG 14 or the second MG 15.

The power split mechanism 50 mechanically couples a crankshaft of the engine 10, a rotation shaft of the first MG 14, and an output shaft of the power split mechanism 50. The output shaft of the power split mechanism 50 is coupled to the transmission mechanism 51. The rotation shaft of the second MG 15 is coupled to the transmission mechanism 51. The transmission mechanism 51 is coupled to the gearbox 52. The gearbox 52 is coupled to the drive shaft 53. Each driving force of the engine 10, the first MG 14, and the second MG 15 is transmitted to the drive wheels 55 via the transmission mechanism 51, the gearbox 52, the drive shaft 53, and the differentials 54.

The gearbox 52 is a stepped automatic shifting device provided between the second MG 15 and the drive shaft 53. The gearbox 52 changes a gear ratio by the control of the ECU 100.

The ECU 100 includes a processing circuit that performs various processing related to the traveling control of the automobile. The ECU 100 is an example of a control unit for the engine system. The ECU 100 functionally achieves an engine control unit, a detection unit, an estimation unit, a determination unit, a stopping unit, a motoring control unit, and a fan control unit, which will be described later.

A power switch 71, a water temperature sensor 72, a crank angle sensor 73, and an air flow meter 74 are electrically connected to the ECU 100. By the on/off operation of the power switch 71, the engine system 1 is switched between a ready-on state in which the engine system 1 is activated and the vehicle is capable of travelling and a ready-off state in which the engine system 1 is stopped and the vehicle is not capable travelling. The water temperature sensor 72 detects a temperature of the cooling water of the engine 10. The temperature of the cooling water is an example of a temperature of the engine 10. The crank angle sensor 73 detects the number of revolutions of the engine 10. The air flow meter 74 detects an intake air amount of the engine 10.

When the required driving force of the engine system 1 is less than a predetermined switching value, the ECU 100 switches a traveling mode of the engine system 1 to a motor traveling mode. The motor traveling mode is a traveling mode in which at least one of the first MG 14 and the second MG 15 is used as a power source in a state where the engine 10 is stopped. In the motor driving mode, the engine 10 is stopped. This improves fuel efficiency.

When the power switch 71 is switched from the ready-on state to the ready-off state, the ECU 100 stops the engine 10, assuming that there is a request to stop the engine system 1. When the power switch 71 is then switched from ready-off state to ready-on state, the ECU 100 starts the engine 10, assuming that there is a request to start the engine system 1. Further, as will be described in detail later, the ECU 100 starts the engine 10 and performs a warm-up process when a predetermined condition is satisfied.

[Schematic Configuration of Engine]

Figure 2:
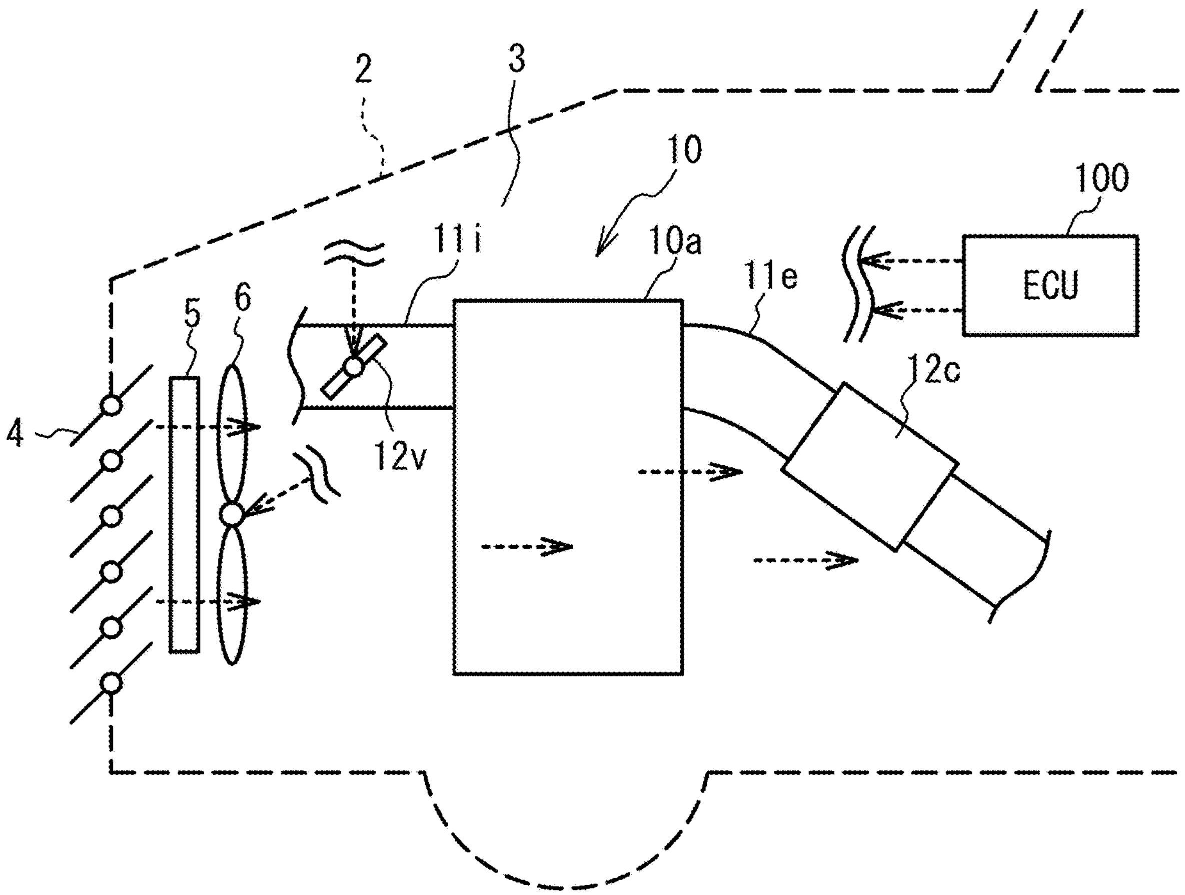
FIG. 2 is a schematic configuration view of an engine mounted in an engine compartment of a vehicle body.

FIG. 2 is a schematic configuration view of the engine 10 mounted in an engine compartment 3 of a vehicle body 2. The engine 10 includes an engine body 10*a*, an intake pipe 11*i*, and an exhaust pipe 11*e*. The intake pipe 11*i* and the exhaust pipe 11*e* are connected to the engine body 10*a*. The intake pipe 11*i* is provided with a throttle 12*v* for adjusting an amount of intake air. The exhaust pipe 11*e* is equipped with a catalyst 12*c* that purifies exhaust gases. A radiator 5 and a fan 6 are disposed in the engine compartment 3. The radiator 5 promotes heat exchange between the cooling water of the engine 10 and the outside air to cool the cooling water.

A grille shutter 4 is provided at the front of the vehicle body 2. The radiator 5 is located opposite the grille shutter 4. The fan 6 is disposed behind the radiator 5. When the fan 6 is driven, outside air is introduced into the engine compartment 3 through the grille shutter 4. As a result, the radiator 5 is cooled. Further, the fan 6 is driven to cause the outside air to flow in the engine compartment 3 and cool the catalyst 12*c*. That is, the fan 6 cools the radiator 5 and the catalyst 12*c*.

[Warm-Up Process]

The ECU 100 starts the engine 10 and performs a warm-up process when a predetermined condition is satisfied. The warm-up process is a process of raising the temperature of the catalyst 12*c* to a warm-up temperature T3. The warm-up process is, for example, a process for controlling an ignition timing of the engine 10 to a retard side from an optimum ignition timing. This increases the exhaust temperature and promotes the temperature rise of the catalyst 12*c*. The warm-up temperature T3 is the lowest temperature at which the exhaust gas purification rate of the catalyst 12*c* is maintained high. The predetermined condition is a case where the cooling water temperature at the time of the initial start of the engine 10 after the activation of the ECU 100 is equal to or lower than a cold temperature T1. The cold temperature T1 is the maximum temperature at which the temperature of the catalyst 12*c* is considered to be less than the warm-up temperature T3. When the cooling water temperature at the time of the initial start is equal to or lower than the cold temperature T1, the temperature of the catalyst 12*c* is also considered to be sufficiently low. By performing the warm-up process together with the start of the engine 10 in this way, the temperature of the catalyst 12*c* is raised and the exhaust emissions are reduced.

When the warm-up process is performed at the time of starting the engine 10 as described above, the temperature of the catalyst 12*c* might excessively rise. Therefore, the ECU 100 performs the following control for suppressing the excessive temperature rise of the catalyst 12*c*.

[Excessive Temperature Rise Suppression Control]

Figure 3:
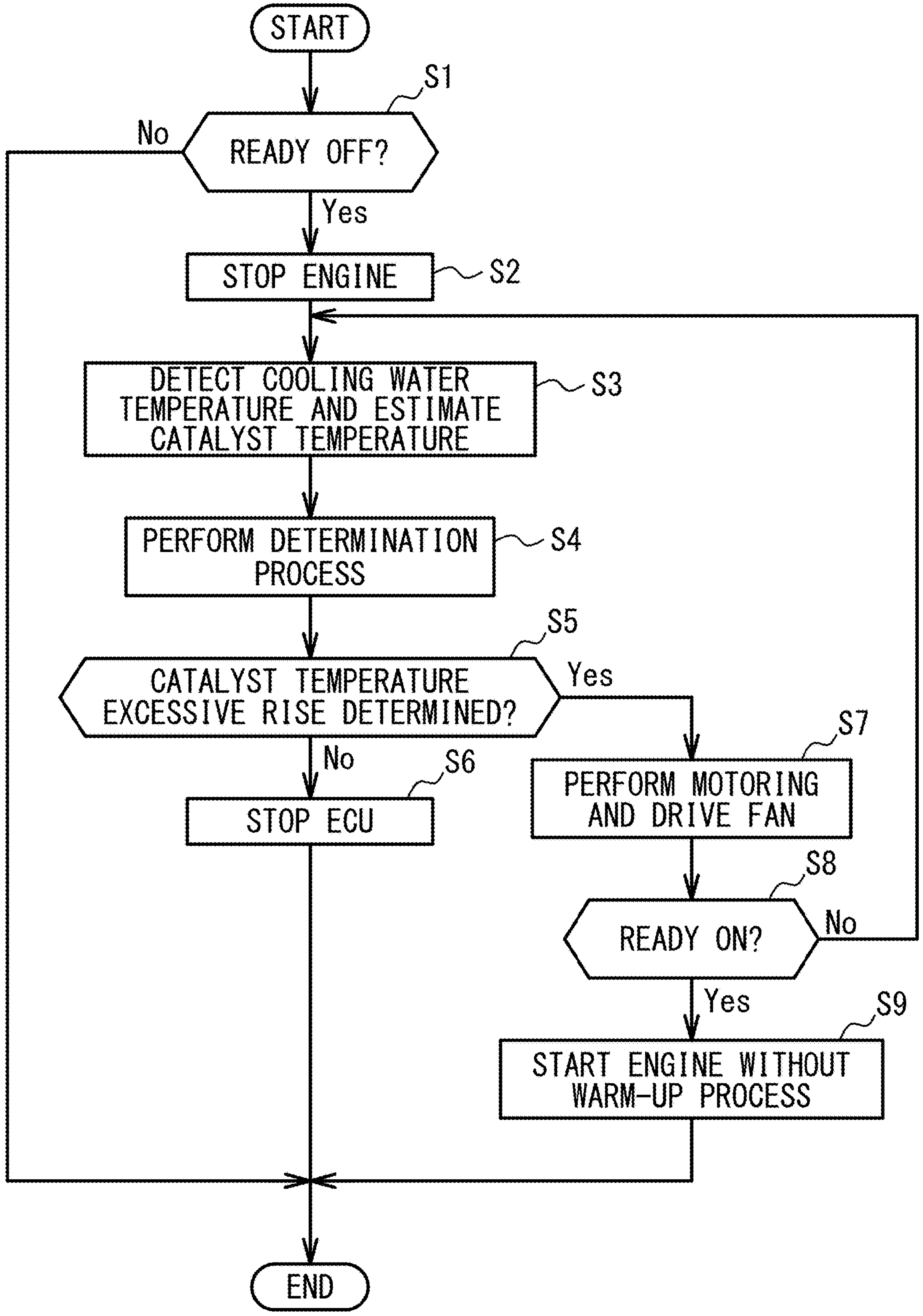
FIG. 3 is a flowchart illustrating an example of excessive temperature rise suppression control performed by an ECU.

FIG. 3 is a flowchart illustrating an example of the excessive temperature rise suppression control performed by the ECU 100. The ECU 100 determines whether or not a state is the ready-off state based on the power switch 71 (step S1). The ready-off state is a state where there is a request to stop the engine system 1 as described above. When the determination result is No in step S1, the control ends. When the determination result in step S1 is Yes, that is, when the power switch 71 is turned off from on, the engine 10 is stopped (step S2).

Next, the ECU 100 detects the cooling water temperature and estimates the temperature of the catalyst 12*c* (step S3). The cooling water temperature is detected based on the water temperature sensor 72. The catalyst temperature is estimated based on the operation state of the engine 10 from the time the engine 10 starts until the ready-off state. Specifically, the catalyst temperature is estimated based on an integrated value of the load of the engine 10 from the start of the engine 10 until the ready-off state. The catalyst temperature is estimated to be higher as the integrated value is larger. After the engine 10 is stopped, the catalyst temperature is estimated based on the catalyst temperature estimated by the above-described method and the elapsed time from the engine stop. The longer the elapsed time from the engine stop, the lower the estimated catalyst temperature. The estimation of the catalyst temperature is performed during the activation of the ECU 100. Step S3 is an example of a process performed by the detection unit and the estimation unit.

Next, the ECU 100 performs a determination process (step S4). The determination process is a process of predicting whether or not the temperature of the catalyst 12*c* excessively rises due to the warm-up process at the time of the initial start of the engine 10 after the next activation of the ECU 100, based on the cooling water temperature and the estimated catalyst temperature. Specifically, when the cooling water temperature is equal to or lower than the cold temperature T1 and the estimated catalyst temperature is equal to or higher than the limit temperature T2 lower than the warm-up temperature T3, the ECU 100 determines that the temperature of the catalyst 12*c* excessively rises (hereinafter, referred to as positive determination). This is because, when the cooling water temperature is equal to or lower than the cold temperature T1, it is predicted that the warm-up process will be performed at the time of the initial start of the engine 10 after the next activation of the ECU 100. Further, when the estimated catalyst temperature is equal to or higher than the limit temperature T2, it is predicted that the temperature of the catalyst 12*c* excessively rises due to the execution of the warm-up process at the time of the initial start of the engine 10 after the next activation of the ECU 100. Therefore, the limit temperature T2 is the lowest temperature at which the catalyst 12*c* excessively rises in temperature due to the execution of the warm-up process at the time of the initial start of the engine 10 after the next activation of the ECU 100.

When the cooling water temperature is higher than the cold temperature T1 or when the estimated catalyst temperature is lower than the limit temperature T2, the ECU 100 determines that the catalyst 12*c* does not excessively rise in temperature (hereinafter, referred to as negative determination). This is because, when the cooling water temperature is higher than the cold temperature T1, it is predicted that the warm-up process is not performed at the time of the initial start of the engine 10 after the next activation of the ECU 100. This is because, when the estimated catalyst temperature is lower than the limit temperature T2, it is predicted that the catalyst 12*c* does not excessively rise even if the warm-up process is performed at the time of the initial start of the engine 10 after the next activation of the ECU 100. Step S4 is an example of a process performed by the determination unit.

Next, the ECU 100 determines whether the determination result is a positive determination (step S5). When the determination result is No in step S5, that is, when it is determined that the catalyst 12*c* does not excessively rise in temperature, the ECU 100 is stopped (step S6). Step S6 is an example of a process performed by the stopping unit.

When the determination result is Yes in step S5, that is, when it is determined that the temperature of the catalyst 12*c* excessively rises, the ECU 100 performs motoring of the engine 10 by the first MG 14 and drives the fan 6 (step S7). The motoring is a process of forcibly rotating the engine 10 by the first MG 14 in a state where fuel injection is stopped and the throttle 12*v* is opened. By motoring the engine 10, air is supplied from the engine 10 to the catalyst 12*c* via the exhaust pipe 11*e*. This promotes cooling of the catalyst 12*c*. Further, as described above, by driving the fan 6, cooling of the catalyst 12*c* is promoted. In this case, the ECU 100 is not stopped and the activated state is maintained. Step S7 is an example of a process performed by the motoring control unit and the fan control unit.

Next, the ECU 100 determines whether or not the state is in the ready-on state based on the power switch 71 (step S8). The ready-on state is a state where there is a request for starting the engine system 1 as described above. When the determination result is Yes in step S8, the ECU 100 starts the engine 10 (step S9). The start of the engine 10 in this case does not correspond to the "initial start" of the engine 10 after the activation of the ECU 100. Therefore, the engine 10 is started without the warm-up process. When the excessive temperature rise of the catalyst 12*c* is predicted in this way, the engine 10 is started without performing the warm-up process. As a result, the excessive temperature rise of the catalyst 12*c* is suppressed.

When the determination result is No in step S8, the ECU 100 performs the process in step S3 and subsequent steps. When the temperature of the catalyst 12*c* is estimated during the motoring of the engine 10 or the driving of the fan 6, it is desirable to estimate the temperature of the catalyst 12*c* in consideration of the motoring or the driving of the fan 6. For example, when motoring or driving of the fan 6 is performed, it is desirable to estimate the temperature of the catalyst 12*c* assuming that the rate of decrease in the temperature of the catalyst 12*c* during stoppage of the engine 10 is higher than when motoring or driving of the fan 6 is not being performed.

Therefore, unless the state is in the ready-on state when the determination result is positive, the motoring of the engine 10 and the driving of the fan 6 are continued. Thus, the cooling of the catalyst 12*c* is promoted, and when it is predicted that the catalyst 12*c* does not rise (No in step S5), the ECU 100 is stopped (step S6). By stopping the ECU 100 when the determination result is a negative determination in this way, an excessive rise in the temperature of the catalyst 12*c* is suppressed even if the warm-up process is performed at the time of the initial start of the engine 10 after the next activation of the ECU 100.

FIGS. 4 to 7 are timing charts illustrating the excessive temperature rise suppression control. FIGS. 4 to 7 illustrate the activation state or the stop state of the ECU 100, the ready on/off state, the cooling water temperature, the engine speed, the warm-up process performance state, and the temperature of the catalyst 12*c*. The actual temperature is indicated by a solid line and the estimated temperature is indicated by a dotted line, as the temperature of the catalyst 12*c*. An excessive temperature T4 is the lowest temperature indicating that the catalyst 12*c* is in an excessive temperature state, and is higher than the warm-up temperature T3.

Figure 4:
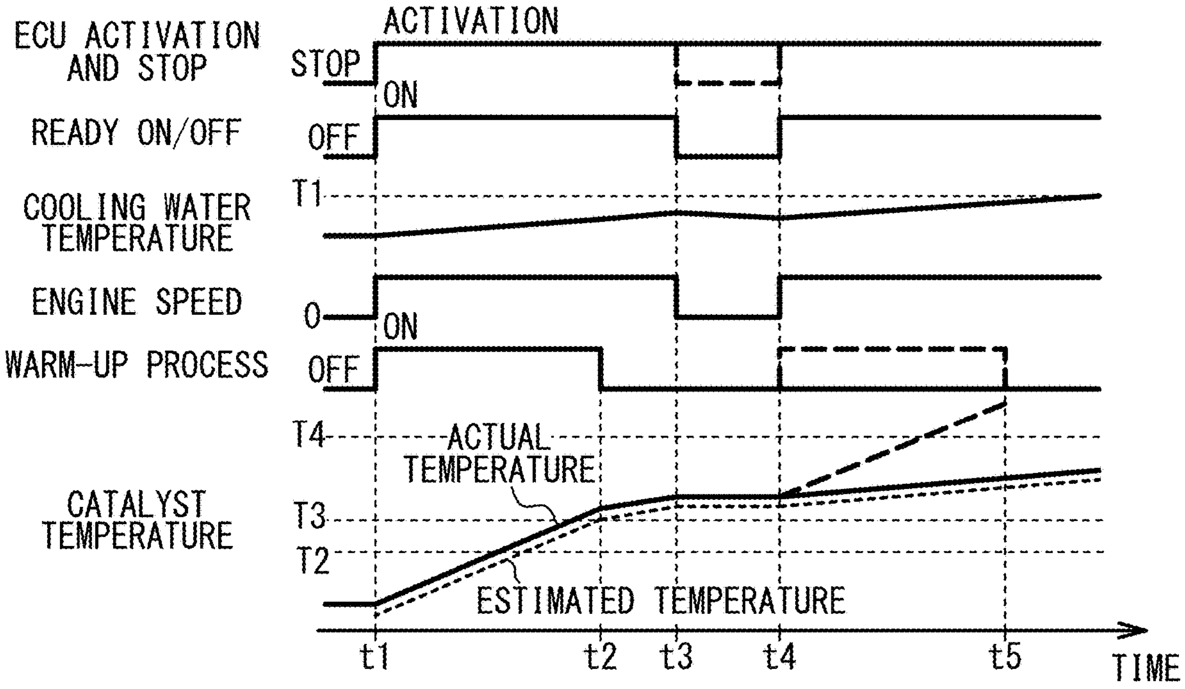
FIG. 4 is a timing chart illustrating an example of the excessive temperature rise suppression control.

FIG. 4 is a timing chart when the determination result is a positive determination and then the ready-on state is made. When the cooling water temperature at the time of the initial start of the engine 10 after the activation of the ECU 100 is equal to or lower than the cold temperature t1, the warm-up process is performed (time t1). When the estimated catalyst temperature is equal to or higher than the warm-up temperature T3, the warm-up process is stopped (time t2). Thereafter, the engine 10 is stopped in the ready-off state, but the ECU 100 is not stopped (time t3). The estimated temperature of the catalyst at the time of ready-off is not less than the limit temperature T2, and the cooling water temperature is not more than the cold temperature T1. Therefore, if the ECU 100 is stopped, the warm-up process is performed at the time of the initial start of the engine 10 after the next activation of the ECU 100, and it is predicted that the temperature of the catalyst 12*c* rises excessively (Yes in step S5).

Thereafter, the ready-on state is made and the engine 10 starts, but the warm-up process is not performed (time t4, Yes in step S8, step S9). This is because this startup does not correspond to the first startup after the activation of the ECU 100.

In FIG. 4, a broken line indicates a case where the ECU 100 is stopped at time t3, the ECU 100 is activated at time t4, and the warm-up process is performed. When the warm-up process is performed at time T4, the actual temperature of the catalyst 12*c* is equal to or higher than the excessive temperature T4 (time t5). In the present embodiment, even when the ready-off state is made, the ECU 100 maintains the activation state, and thus the engine 10 is started without performing the warm-up process at the time of the ready-on state. In this way, an excessive rise in the temperature of the catalyst 12*c* is suppressed. In the example of FIG. 4, motoring of the engine 10 and driving of the fan 6 are performed from time t3 to time t4.

Figure 5:
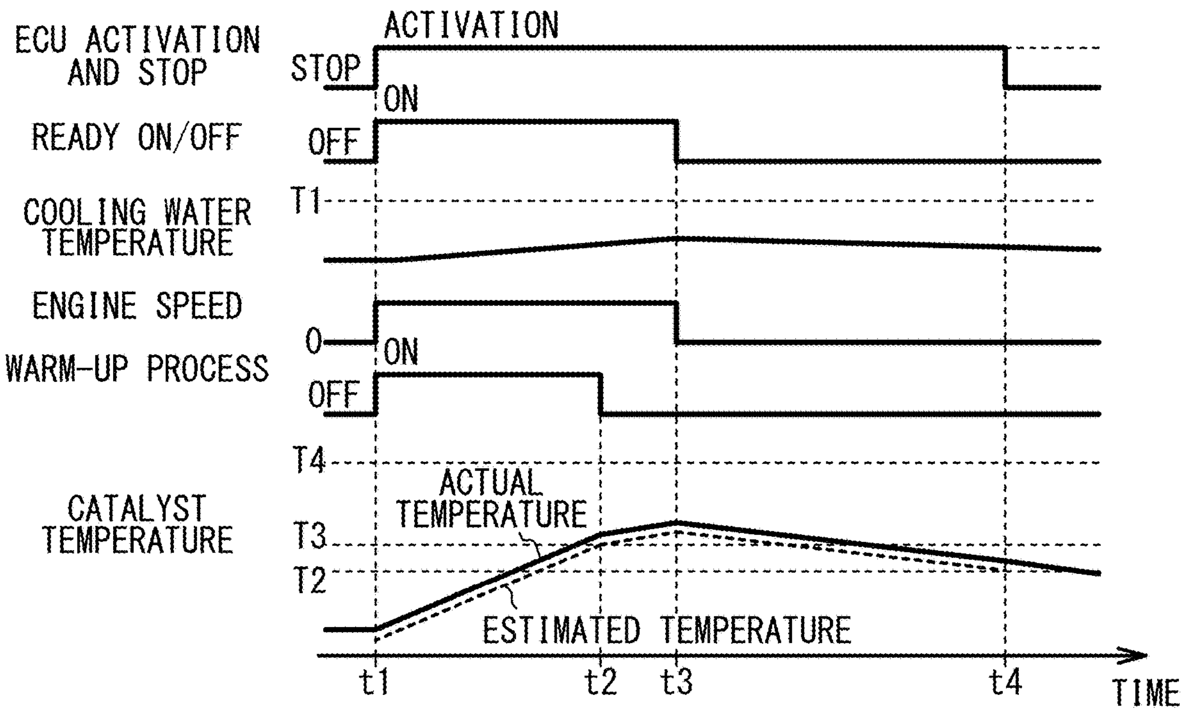
FIG. 5 is a timing chart illustrating an example of the excessive temperature rise suppression control.

FIG. 5 is a timing chart illustrating a case where the determination result is changed from a positive determination to a negative determination. The warm-up process is performed (time t1) and stopped (time t2). The engine 10 is stopped in the subsequent ready-off state, but the ECU 100 is not stopped (time t3). This is because, as in the case of FIG. 4, it is predicted that the temperature of the catalyst 12*c* rises excessively (Yes in step S5).

Thereafter, the estimated temperature of the catalyst is lower than the limit temperature T2, and the ECU 100 is stopped (time t4, step S6). This is because it is predicted that the temperature of the catalyst 12*c* does not rise excessively even if the warm-up process is performed at the time of the initial start of the engine 10 after the next activation of the ECU 100 (No in step S5). In this way, an excessive rise in the temperature of the catalyst 12*c* is suppressed. In the example of FIG. 5, motoring of the engine 10 and driving of the fan 6 are performed from time t3 to time t4.

Figure 6:
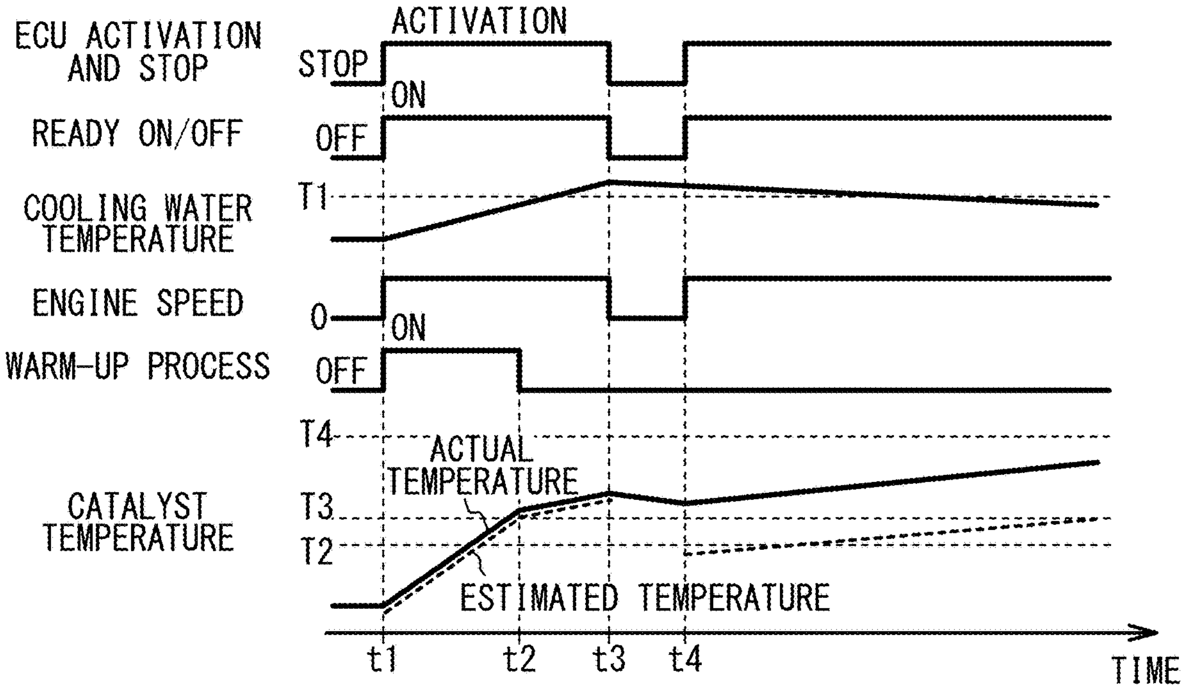
FIG. 6 is a timing chart illustrating an example of the excessive temperature rise suppression control.

FIG. 6 is a timing chart illustrating a case where the determination result is a negative determination. The warm-up process is performed (time t1) and stopped (time t2). Thereafter, the engine 10 is stopped in the ready-off state, and the ECU 100 is also stopped (time t3, step S6). The cooling water temperature is higher than the cold temperature T1 at the time of ready-off state. Therefore, it is predicted that the warm-up process is not performed at the time of the initial start of the engine 10 after the next activation of the ECU 100 (No in step S5). Thereafter, the ECU 100 is activated to start the engine 10 in the ready-on state, but the warm-up process is not performed because the cooling water temperature is higher than the cold temperature T1 (time t4). In this way, since the warm-up process is avoided, the excessive temperature rise of the catalyst 12*c* is suppressed.

As illustrated in FIG. 6, the estimation of the catalyst temperature is not performed during the stop of the ECU 100. As illustrated in FIG. 6, the estimated temperature of the ECU 100 at the time of starting the engine might deviate from the actual temperature. This is because, in the present embodiment, the catalyst temperature at the time of start-up of the ECU 100 is estimated based on the cooling water temperature at the time of start-up as a value that correlates with the cooling water temperature at the time of start-up. That is, at the time of activation of the ECU 100, the catalyst temperature is estimated based on the cooling water temperature without considering the influence of the exhaust heat of the engine 10 received by the catalyst 12*c*. Therefore, for example, when it is determined whether or not to perform the warm-up process based on the estimated catalyst temperature at the time of activation of the ECU 100, the warm-up process might be performed at time t4 in FIG. 6, and the catalyst 12*c* might be overheated. In this embodiment, whether or not to perform the warm-up process is determined based on the cooling water temperature at the time of activation of the ECU 100, and therefore, an excessive rise in temperature of the catalyst 12*c* is suppressed.

Figure 7:
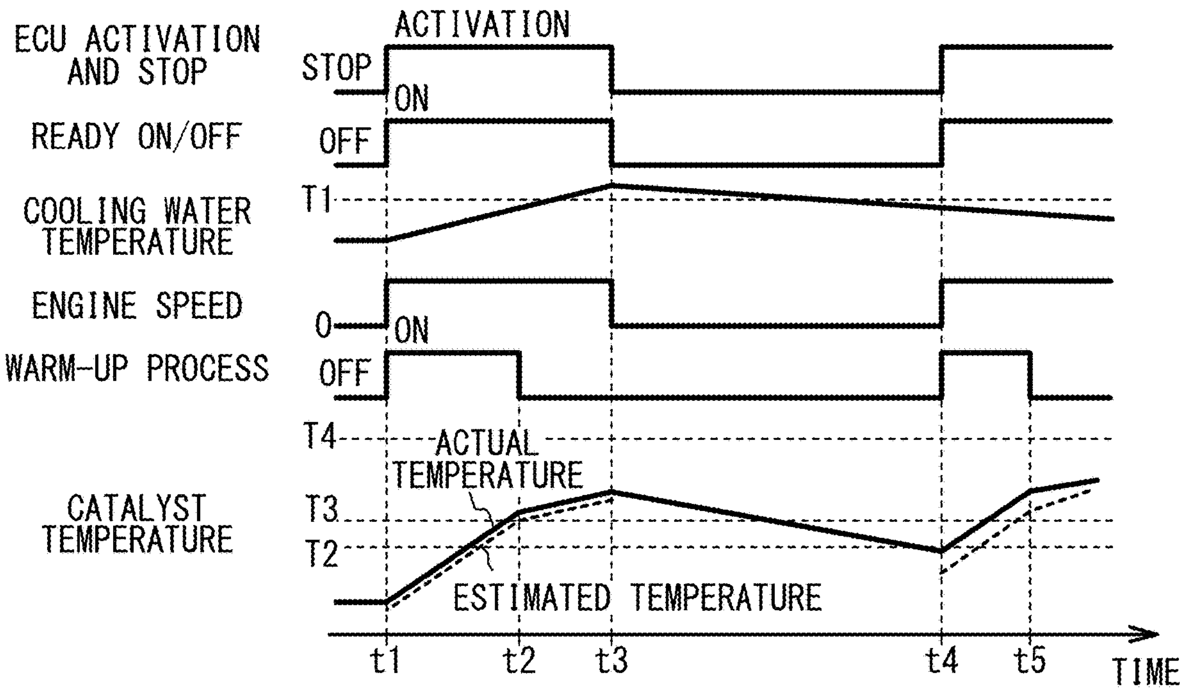
FIG. 7 is a timing chart illustrating an example of the excessive temperature rise suppression control.

FIG. 7 is a timing chart illustrating a case where the determination result is a negative determination and the warm-up process is performed at the time of the subsequent ready-on state. The warm-up process is performed (time t1), and the warm-up process is stopped (time t2). Thereafter, the engine 10 is stopped in the ready-off state, and the ECU 100 is also stopped (time t3, step S6). This is because the cooling water temperature is higher than the cold temperature T1 at the time of the ready-off state, and it is predicted that the warm-up process is not performed at the time of the initial start of the engine 10 after the next activation of the ECU 100 (No in step S5).

Thereafter, when the ECU 100 is activated by the ready-on state and the engine 10 is started, the warm-up process is performed (time t4). This is because the cooling water temperature is equal to or lower than the cold temperature T1. Thereafter, the warm-up process is stopped (time t5). In this way, when the ready-on state is made after the cooling water temperature has sufficiently decreased, the warm-up process is performed to reduce exhaust emissions. When the cooling water temperature is equal to or lower than the cold temperature T1, the actual temperature of the catalyst 12*c* also is lower than the limit temperature T2, and therefore, even if the warm-up process is performed, an excessive rise in the temperature of the catalyst 12*c* is suppressed. At time t4, the estimated temperature of the catalysts at the time of starting the ECU 100 is deviated from the actual temperature for the above-described reason.

As described above, the determination process is performed again until the determination result is negative, and the ECU 100 is stopped when the determination result is negative. In this case, as illustrated in FIG. 7, the warm-up process is performed when the temperature of the engine 10 at the time of the initial start of the engine 10 after the activation of the ECU 100 is equal to or lower than the cold temperature. As described above, in order to determine whether or not to perform the warm-up process at the next start of the engine 10, it is not needed to estimate the temperature of the catalyst 12*c* at the next engine start. Therefore, it is not needed to measure the stop period of the engine 10 and to acquire the outside air temperature during the stop period of the engine 10. In this way, the control is simplified. As described above, the determination process is performed based on the cooling water temperature and the estimated catalyst temperature at the time of the ready-off state. By such simple control, it is predicted whether or not the temperature excessively rises.

In the above embodiment, the engine system 1 mounted on the hybrid vehicle has been described as an example, but the present invention is not limited thereto, and the engine system 1 may be mounted on an engine vehicle. However, in this case, the engine 10 cannot be motored. In the above embodiment, when the excessive temperature rise of the catalyst 12*c* is predicted, the engine 10 is motored and the fan 6 is driven, but only one of them may be performed. In the above embodiment, the temperature of the cooling water is described as an example of the temperature of the engine 10. However, the temperature of the engine 10 may be the temperature of the lubricating oil.

Although some embodiments of the present disclosure have been described in detail, the present disclosure is not limited to the specific embodiments but may be varied or changed within the scope of the present disclosure as claimed.

What is claimed is:

1. A control unit for an engine system including an engine and a catalyst for purifying exhaust gas from the engine, the control unit comprising:

an engine control unit configured to start the engine and perform a warm-up process for raising a temperature of the catalyst to a warm-up temperature when a temperature of the engine at an initial start of the engine after activation of the control unit is equal to or lower than a cold temperature, and configured to stop the engine when a stop request to the engine system is made;

a detection unit configured to detect a temperature of the engine when the stop request is made;

an estimation unit configured to estimate a temperature of the catalyst based on an operation state of the engine from a start of the engine to the stop request, when the stop request is made;

a determination unit configured to perform a determination process for predicting whether or not the temperature of the catalyst rises excessively due to execution of the warm-up process at a time of the initial start of the engine after next activation of the control unit, based on the temperature of the engine and the temperature of the catalyst, when the stop request is made; and a stopping unit configured to stop the control unit based on a determination result of the determination unit, wherein when the determination result is a negative determination, the stopping unit stops the control unit, when the determination result is a positive determination, the determination unit reperforms the determination process, when the determination result is a positive determination and there is a request to start the engine system, the engine control unit starts the engine without performing the warm-up process, and when the determination result obtained by reperforming the determination process is a negative determination, the stopping unit stops the control unit.

2. The control unit for the engine system according to claim 1, wherein the engine system includes a motor that performs motoring of the engine in a state where fuel injection is stopped and a throttle valve is opened, and the control unit further comprises a motoring control unit configured to perform motoring of the engine by the motor when the determination result is a positive determination.

3. The control unit of the engine system according to claim 1, wherein the engine system includes a radiator that cools cooling water of the engine and a fan that cools the radiator and the catalyst, and the control unit further comprises a fan control unit configured to drive the fan when the determination result is a positive determination.

4. The control unit for the engine system according to claim 1, wherein when the stop request is made, the determination unit is configured to make a positive determination in a case where the temperature of the engine is equal to or lower than the cold temperature and the temperature of the catalyst is equal to or higher than a limit temperature lower than the warm-up temperature, when the stop request is made, the determination unit is configured to make a negative determination in a case where the temperature of the engine is higher than the cold temperature or in a case where the temperature of the catalyst is lower than the limit temperature, and the limit temperature is a temperature at which the temperature of the catalyst excessively rises due to execution of the warm-up process at the time of initial start of the engine after the next activation of the control unit.

5. The control unit for the engine system according to claim 4, wherein when the stop request is made and the temperature of the engine is higher than the cold temperature, the determination unit is configured to predict that the warm-up process is not performed at the time of initial start of the engine after the activation of the control unit, and to make the negative determination, and when the stop request is made and the temperature of the catalyst is lower than the limit temperature, the determination unit is configured to predict that the temperature of the catalyst does not excessively rise even if the warm-up process is performed at the time of initial start of the engine after the activation of the control unit, and to make the negative determination.

* * * * *